(12) United States Patent
Marti et al.

(10) Patent No.: US 12,309,557 B2
(45) Date of Patent: May 20, 2025

(54) SELECTIVE SOUND MODIFICATION FOR VIDEO COMMUNICATION

(71) Applicant: HARMAN INTERNATIONAL INDUSTRIES, INCORPORATED, Stamford, CT (US)

(72) Inventors: Stefan Marti, Oakland, CA (US); Neeka Mansourian, El Dorado Hills, CA (US); Joseph Verbeke, San Francisco, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 228 days.

(21) Appl. No.: 17/634,940

(22) PCT Filed: Aug. 14, 2019

(86) PCT No.: PCT/IB2019/056918
§ 371 (c)(1),
(2) Date: Feb. 11, 2022

(87) PCT Pub. No.: WO2021/028716
PCT Pub. Date: Feb. 18, 2021

(65) Prior Publication Data
US 2022/0337945 A1    Oct. 20, 2022

(51) Int. Cl.
*H04R 3/00* (2006.01)
*G06T 7/20* (2017.01)
(Continued)

(52) U.S. Cl.
CPC .............. *H04R 3/005* (2013.01); *G06T 7/20* (2013.01); *G06V 10/235* (2022.01); *G06V 20/40* (2022.01);
(Continued)

(58) Field of Classification Search
CPC .............. H04R 1/403; H04R 2201/403; H04R 2201/405; H04R 2203/12; H04R 3/12;
(Continued)

(56) References Cited

U.S. PATENT DOCUMENTS

| 5,335,011 A | * | 8/1994 | Addeo | ................... H04R 1/406 348/E7.083 |
| 6,483,532 B1 | * | 11/2002 | Girod | ..................... H04N 7/147 348/E7.079 |

(Continued)

FOREIGN PATENT DOCUMENTS

WO    2017/074821 A1    5/2017

OTHER PUBLICATIONS

Zarkov, Georgi, "The Galaxy Note 10 Has A Zoom-In Mic Feature To Hone In On Audio" Aug. 7, 2019, pp. 1-3, available at https://www.phonearena.com/news/Samsung-Galaxy-Note-10-new-feature-mic-zoom-in_id118037.

(Continued)

Primary Examiner — Lun-See Lao
(74) Attorney, Agent, or Firm — Artegis Law Group, LLP

(57) ABSTRACT

In various embodiments, a communication application selectively modifies sounds associated with a selected location or entity in one or more images. In operation, the communication application receives an image of an environment of a first device and an audio signal associated with the environment. The communication application receives first user input selecting a location in the image, and modifies a first sound included in the audio signal based on the selected location in the image, where at least a portion of the audio signal is unmodified.

20 Claims, 12 Drawing Sheets

(51) Int. Cl.
  *G06V 10/22* (2022.01)
  *G06V 20/40* (2022.01)
  *G06V 40/10* (2022.01)
  *H04L 65/403* (2022.01)
  *H04R 1/32* (2006.01)
  *H04R 1/40* (2006.01)

(52) U.S. Cl.
  CPC ............. *H04R 1/326* (2013.01); *H04R 1/406* (2013.01); *G06T 2207/10016* (2013.01); *G06T 2207/20104* (2013.01); *G06V 40/10* (2022.01); *H04L 65/403* (2013.01)

(58) Field of Classification Search
  CPC .... H04R 1/326; H04R 1/406; H04R 2430/01; H04R 2499/11; H04R 3/005; H04S 2420/01; H04S 2420/13; H04S 7/303; H04S 2400/15; H04S 7/30; G06V 10/235; G06V 20/40; G06V 20/52; G06V 40/10; G06V 40/103; G10L 2021/02166; H04L 65/403; H04N 21/4394; H04N 21/44218; H04N 23/611; H04N 7/147; H04N 7/183
  USPC .................................. 381/92, 56–58; 700/94
  See application file for complete search history.

(56) References Cited

U.S. PATENT DOCUMENTS

| | | | | |
|---|---|---|---|---|
| 9,602,700 | B2* | 3/2017 | Ahiska | H04N 23/661 |
| 2009/0046075 | A1* | 2/2009 | Kim | H04M 1/72403 |
| | | | | 345/173 |
| 2010/0123785 | A1* | 5/2010 | Chen | H04N 23/611 |
| | | | | 382/118 |
| 2011/0063405 | A1 | 3/2011 | Yam | |
| 2014/0287779 | A1* | 9/2014 | O'Keefe | H04L 67/52 |
| | | | | 455/456.3 |
| 2016/0100092 | A1 | 4/2016 | Bohac | |
| 2017/0127008 | A1* | 5/2017 | Kankaanpää | H04N 21/42204 |
| 2018/0165255 | A1* | 6/2018 | Gafford | G09B 5/06 |

OTHER PUBLICATIONS

International Search Report and Written Opinion of International Application No. PCT/IB2019/056918, Nov. 20, 2019, 13 pages.

* cited by examiner

SELECTIVE SOUND MODIFICATION FOR VIDEO COMMUNICATION

CROSS-REFERENCE TO RELATED APPLICATIONS

The present application is a national stage application of the international application titled, "SELECTIVE SOUND MODIFICATION FOR VIDEO COMMUNICATION," filed on Aug. 14, 2019 and having application number PCT/IB2019/056918. The subject matter of this related application is hereby incorporated herein by reference.

BACKGROUND

Field of the Various Embodiments

The various embodiments relate generally to audio processing, and more specifically, to selective sound modification for video communication.

Description of the Related Art

Video communication has become a widely accepted form of communication between remote parties. First gaining prominence in the business context with video conferencing, the use of video communication has spread into everyday usage with consumer-level applications and devices implementing various types of video communication features.

Video communication typically involves two parties communicating with video and audio via respective devices. Oftentimes, there may be multiple sound sources on one or both sides of a video communication session. For example, one side of a video communication session may include a party with multiple persons. As another example, one or both sides of the video communication session may include sources of background sound, such as animals, noisy devices, weather noise, etc.

One drawback of conventional video communication techniques is that the audio in a video communication session may include sounds that are not intended or not desirable for inclusion in the video communication session. For example, microphones on one side of a video communication session may capture noises from various background sources. The noises may distract the party on the other side and/or may prevent parties from both sides of the session from hearing each other, thereby reducing the effectiveness and enjoyment of the video communication session. In response to this drawback, some video communication techniques may include voice isolation, where certain types of sounds (e.g., sounds other than human voices) are attenuated or even cancelled. However, a drawback of such techniques is that the attenuation is too coarse—for example, not all of the voices that are isolated are desirable, and not all of the non-voice audio that is attenuated is undesirable. By cancelling potentially desirable audio and not cancelling potentially undesirable audio, such techniques also reduce the effectiveness and enjoyment of the video communication session.

Accordingly, more effective techniques for modifying the audio content in video communications would be useful.

SUMMARY

One embodiment sets forth a method for modifying a sound included in an audio signal. The method includes receiving, via a first device, an image of an environment of the first device and an audio signal associated with the environment; receiving first user input selecting a location in the image; and modifying a first sound included in the audio signal based on the selected location in the image, wherein at least a portion of the audio signal is unmodified.

Another embodiment sets forth a method for orienting a directionality of an audio sensor. The method includes acquiring an image of an environment of a first device, receiving information associated with a location in the image selected via user input, and, based on the information, causing a directionality of at least one audio sensor at the first device to be oriented toward a first location in the environment that corresponds to the location the image.

Further embodiments provide, among other things, a system and one or more computer-readable storage media configured to implement at least one of the methods set forth above.

At least one advantage and technological improvement of the disclosed techniques is that the audio content of a video communication session may be selectively modified. Accordingly, undesirable sounds in a video communication session may be reduced or eliminated and/or desirable sounds in the session may be amplified, thereby enhancing the effectiveness and enjoyment of the video communication experience.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Embodiments disclosed herein include a video communication system that includes a first device located in a first environment and a second device. At least the first device includes an image sensor and an audio sensor. At the second device, a processing unit operates to receive an image of the first environment via the image sensor of the first device, receive a user input selecting a location in the image, and modify audio content received from the first device based on the selected location in the image.

In various embodiments, at the second device, a user may select a location in an image of the first environment that is displayed via the second device. In response to the selection, the second device may determine the selected location and/or an entity at the selected location. The second device may then cause sounds associated with the selected location and/or entity to be modified. In some embodiments, after receiving a user selection, the second device transmits the selected location and/or the entity to the first device, which may orient the directionality of an audio sensor of the first device toward the selected location and/or entity. In the same or other embodiments, the second device processes an audio signal received via the first device to recognize sounds associated with the selected location and/or entity and to modify those sounds while maintaining the other sounds included in the audio signal. Other approaches may be implemented in addition to or instead of the approaches described above, as discussed below in further detail.

The first and second devices of the video communication system may be implemented in various forms, such as smartphones, tablet computers, desktop computers, laptop computers, video conferencing devices, smart displays, in-vehicle infotainment systems, television sets, etc. Further, the first device and/or the second device may include a device coupled to a dock or mount that includes one or more input and/or output devices.

Figure 1:
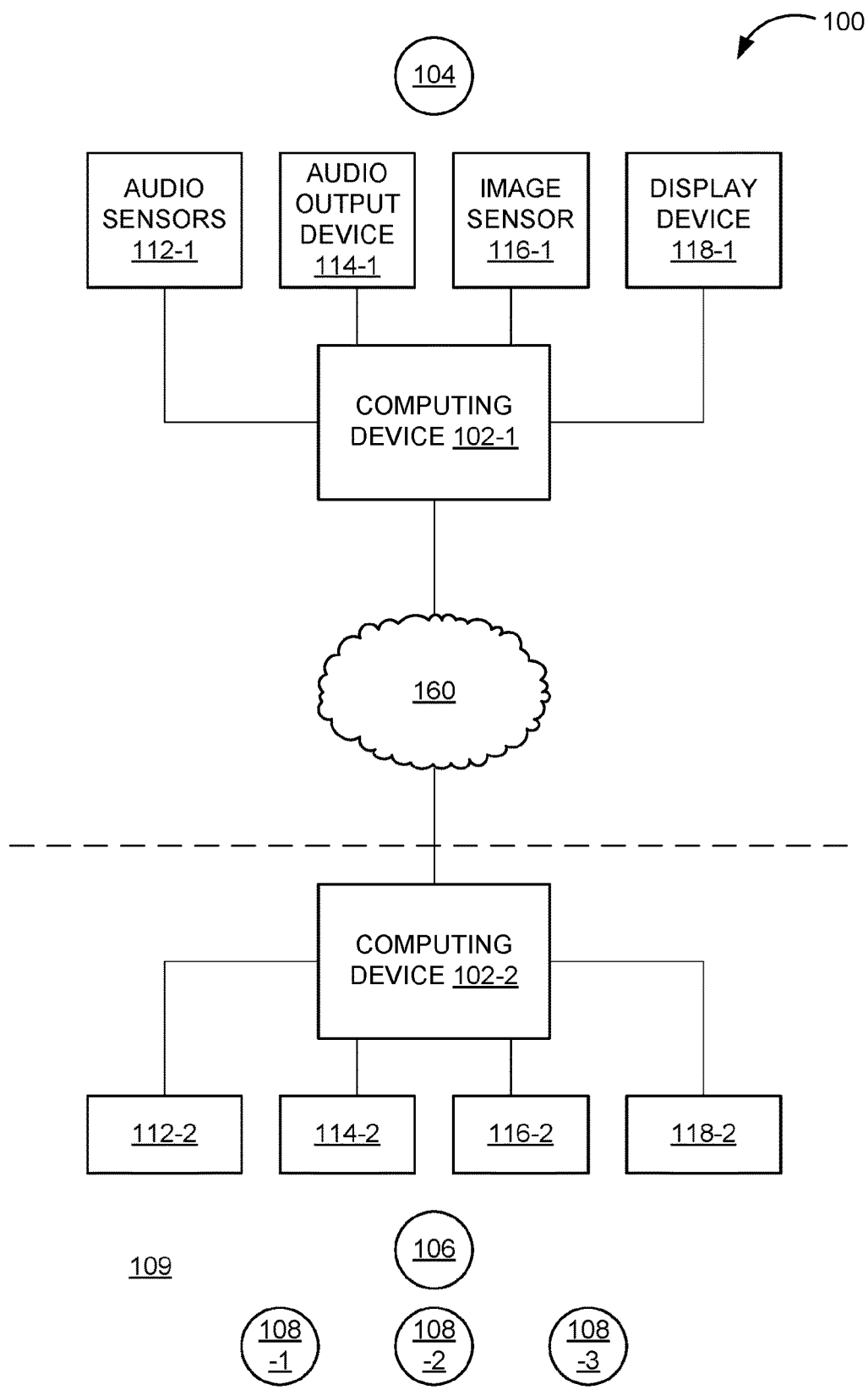
FIG. 1 illustrates a video communication system, according to one or more aspects of the various embodiments.

FIG. 1 illustrates a video communication system 100, according to one or more aspects of the various embodiments. The video communication system 100 includes a first computing device 102-1 and a second computing device 102-2. The computing devices 102 may be communicatively coupled via one or more networks 160. In various embodiments, a computing device 102 includes one or more audio sensors 112, an audio output device 114, an image sensor 116, and a display device 118.

In various embodiments, computing device 102-1 may receive video and audio data from computing device 102-2. At a computing device 102, such as computing device 102-2, an image sensor 116-2 captures one or more images of an environment 109 in which the computing device 102-2 is located. The images may include the user 106 and any number of other entities 108 (e.g., animals, objects, other people) that may be in the environment 109. An audio sensor 112-2 captures sounds occurring in the environment 109 and generates an audio signal that includes the captured sounds. The sounds may include speech and other sounds made by the user 106 (e.g., a user 106 at computing device 102-2 speaking to the user 104 at computing device 102-1), sounds made by other entities 108, and/or other ambient sounds. The images and audio signal may be transmitted (e.g., as streaming video and audio, respectively) from computing device 102-2 to computing device 102-1 via the one or more networks 160, and the computing device 102-1 may receive the images and audio signal. In various embodiments, the user 106 is another entity that is in the environment 109 along with entities 108—the user 106 is actively engaging in the video communication session with user 104 and entities 108 may be in proximity to user 106. Additionally, there may be one or more additional entities (not shown) on the side of computing device 102-1 besides user 104. For example, additional users may participate in the video communication session on the side of and along with user 104.

As noted above, the computing device 102-1 may receive the images and audio signal transmitted from computing device 102-2. The images may be displayed on a display device 118-1. The user 104 may make one or more inputs (e.g., via an input device, not shown in FIG. 1) to select a location in one or more of the images (e.g., a location in one or more frames of the video) displayed on display device 118-1. Based on the selected location, the audio signal received from computing device 102-2 may be selectively modified, and the modified audio signal may be output via audio output device 114-1.

As noted above, the user 104 may select a location in the images. In various embodiments, in response to the selection, the computing device 102-1 may cause the directionality of audio sensor 112-2 to be oriented toward a location in the environment 109 that corresponds to the selected location in the images, thereby modifying the audio signal transmitted to computing device 102-2. Consequently, sounds originating from that location in the environment 109 may be made more prominent during the video communication session.

In some embodiments, the computing device 102-1 may, in response to the selection, recognize an entity 108, for example entity 108-2, that is captured at that location in the images. The computing device 102-1 may further recognize a type to which entity 108-2 belongs (e.g., that entity 108-2 is an animal, that entity 108-2 is a dog, etc.). The computing device 102-1 may modify the audio signal received from computing device 102-2. In particular, the computing device 102-1 may modify sounds in the audio signal associated with entity 108-2 and/or a type to which entity 108-2 belongs.

While the above describes modifying the audio signal transmitted from computing device 102-2 to computing device 102-1, an audio signal transmitted from computing device 102-1 to computing device 102-2 may be made in a similar manner as described above. For example, a user 106 at computing device 102-2 may select a location in one or more video or image frames received via image sensor 116-1. In response to the selection, sounds within the audio signal, received from computing device 102-1, that are associated with the selected location and/or an entity at the selected location may be modified.

Figure 2:
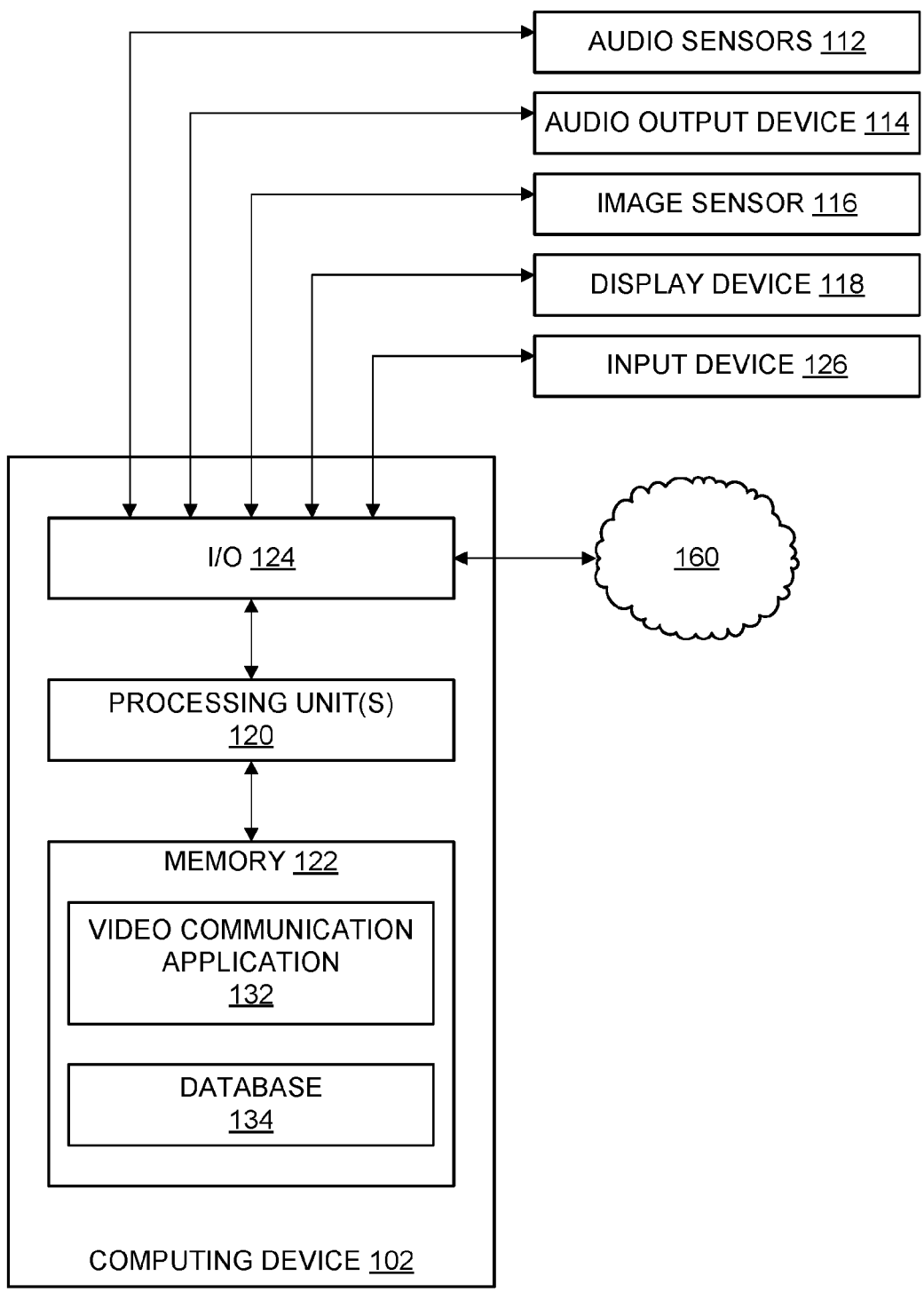
FIG. 2 illustrates a computing device configured to implement one or more aspects of the various embodiments.

FIG. 2 illustrates a computing device 102 configured to implement one or more aspects of the various embodiments. As shown, computing device 102 includes one or more audio sensors 112, an audio output device 114, an image sensor 116, a display device 118, and input device(s) 126. The computing device 102 further includes one or more processing units 120, memory 122, and input/output (I/O) 124.

The processing unit(s) 120 may include any processing element capable of performing the functions described herein. While depicted as a single element within the computing device 102, processing unit(s) 120 is intended to represent a single processor, multiple processors, a processor or processors having multiple cores, as well as combinations thereof. The processing unit 120 may be any suitable processor, such as a central processing unit (CPU), a graphics processing unit (GPU), an application-specific integrated circuit (ASIC), a field programmable gate array (FPGA), a digital signal processor (DSP), any other type of processing unit, or a combination of different processing units, such as a CPU configured to operate in conjunction with a DSP. In general, processing unit 120 may be any technically feasible hardware unit capable of processing data and/or executing software applications or modules, including video communication application 132.

Memory 122 may include a variety of computer readable media selected for their size, relative performance, or other capabilities: volatile and/or non-volatile media, removable and/or non-removable media, etc. Memory 122 may include cache, random access memory (RAM), storage, etc. Of course, various memory chips, bandwidths, and form factors may alternately be selected. Storage included as part of memory 122 may typically provide a non-volatile memory for the computing device 102, and may include one or more different storage elements such as flash memory, a hard disk drive, a solid state drive, an optical storage device, and/or a magnetic storage device.

Memory 122 may include one or more applications or modules for performing the functions described herein. In various embodiments, any of the modules and/or applications included in memory 122 may be implemented locally by the computing device 102 and/or may be implemented via a cloud-based architecture. For example, any of the modules and/or applications included in memory 122 may be executed on a remote device (e.g., a server system, a cloud computing platform, etc.) that communicates with computing device 102 via I/O 124 or network 160.

As shown, memory 122 includes a video communication application 132 for communicating audio content and video content with other computing devices 102 in video communication system 100 and selectively modifying sounds in the audio content based on selections of locations on the video content. In various embodiments, the video communication application 132 displays the video content, receives user input selecting a location in one or more images or frames of the video content, and modifies certain sounds in the audio content based on the selected location. In some embodiments, memory 122 may include an application or module for selectively modifying sounds in the audio content based on selections of locations on the video content. That application or module may be a sub-module of video communication application 132 or a separate application or module that operates in conjunction with video communication application 132. Memory 122 further includes a database 134 that stores information. The information stored in database 134 may include trained data for machine learning processes (e.g., neural networks). The trained data may include data for object and/or face recognition in images and data for sound object recognition.

The processing unit 120 may communicate with other devices, such as peripheral devices or other networked computing devices, using input/output (I/O) 124. I/O 124 may include any number of different I/O adapters or interfaces used to provide the functions described herein. I/O 124 may include wired and/or wireless connections, and may use various formats or protocols (e.g., Bluetooth® (a registered trademark of the Bluetooth Special Interest Group), Wi-Fi® (a registered trademark of the Wi-Fi Alliance), Universal Serial Bus (USB), etc.).

I/O 124 may also include one or more network interfaces that couple the processing unit 120 to one or more networked computing devices through a network 160. Examples of networked computing devices include a cloud computing system, a server system, a desktop computer, a laptop computer, a mobile computing device such as a smartphone or tablet computer, and a smart display. Of course, other types of computing devices may also be networked with processing unit 120. Network 160 may include one or more networks of various types, including a local area or local access network (LAN), a general wide area network (WAN), and/or a public network (e.g., the Internet). In some embodiments, the networked computing devices may be used as additional processing units 120 or additional memory 122.

Input devices 126 are coupled with the processing device 120 and provide various inputs to the processing device 120. In some embodiments, input devices 126 may include a user interface to receive user inputs, such as user selections of certain locations on an image (e.g., one or more images or frames of video) and manipulations of certain controls (e.g., a volume control, a zooming control). The user interface may take any feasible form for providing the functions described herein, such as one or more touch-sensitive displays (e.g., touch screens), one or more touch-sensitive surfaces, a keyboard, a mouse, a trackball, a pointing device, buttons, toggles, sliders, dials, knobs, a gesture recognition system (e.g., a vision-based gesture recognition system, wired gloves, gesture-based controllers), etc. The input devices 126 may be used to interact with content and controls displayed on a display device 118 (e.g., video content, a graphical user interface with one or more controls).

Audio sensors 112 are included to capture sound waves occurring in the environment and to generate an audio signal from the captured sound waves. The audio sensors 112 may include one or more microphones (e.g., an omnidirectional microphone, a microphone array) or other transducers or sensors capable of converting sound waves into an electrical audio signal. In some embodiments, the audio sensor 112 includes a directional audio sensor. That is, the audio sensor has a directionality characteristic that may be controlled (e.g., via software-controlled beamforming, by physically orienting the audio sensor). The audio sensors 112 may include an array of sensors that includes sensors of a single type, or a variety of different sensor types. Audio sensors 112 may be disposed at the computing device 102 or separately from the computing device 102. The audio sensors 112 may be fixed, or moveable and orientable in any technically feasible manner. The audio sensors 112 may be disposed in any feasible manner in the environment. In some embodiments, the audio sensors 112 include an omnidirectional audio sensor (e.g., an omnidirectional microphone) and a directional audio sensor (e.g., a directional microphone or microphone array).

Audio output devices 114 are included to output audio signals. The audio output devices 114 may use any technically feasible audio output techniques, such as loudspeakers, transducers, or other suitable electroacoustic devices. Audio output devices 114 may be implemented using any number of form factors, such as discrete loudspeaker devices, on-device speakers, around-the-ear (circumaural), on-ear (supraaural), or in-ear headphones, hearing aids, wired or wireless headsets, body-worn (e.g., head, shoulder, arm, etc.) listening devices, body-worn close-range directional speakers or speaker arrays, body-worn ultrasonic speaker arrays, and so forth. The audio output devices 114 may be disposed at the computing device 102 or separately at a fixed location or movable. Further, audio output device 114 may be directional (e.g., using a single directional transducer, using multiple transducers to create an audio beam). Audio output device 114 may produce one or more directional audio beams, in addition to or alternatively to omnidirectional audio.

The image sensor 116 may acquire images of the environment in which the computing device 102 is located. In various embodiments, the image sensor 116 include, without limitation, any number and combination of infrared cameras, RGB cameras, camera arrays that provide multiple perspectives of the environment, and depth cameras that sense entities (e.g., objects, people, animals).

The display device 118 may display visual content (e.g., images, video) to a user of the computing device 102. In various embodiments, the display device 118 is a display device (e.g., liquid-crystal display (LCD) screens, light-emitting diode (LED) display screens, organic light-emitting diode (OLED) display screens, a two-dimensional or three-dimensional (e.g., holographic) projection system, etc.) configured to output visual content received from another computing device 102. In some embodiments, the computing device 102 may include multiple display devices 118. For example, a display device may be configured to display visual content, and a touch-sensitive display may be configured to display the same visual content and receive on the display user inputs that interact with the visual content.

It should be appreciated that various embodiments of the computing device 102 may have different configurations of the various components shown in FIG. 2. For example, in one embodiment, the computing device 102, the audio sensors 112, the audio output devices 114, the display device 118, and the input devices 126, may be included in one device, such as a smartphone, a tablet computer, a smart display, a laptop computer, in-vehicle infotainment unit or display, television set, and so forth. In another embodiment, the audio sensors 112 and optionally the audio output device 114 may be separate from the computing device 102 (e.g., on a docking station, on a device mount, on a sleeve or case), and the computing device 102 is communicatively coupled to the docking station or device mount or sleeve/case via I/O 124. As another example, the audio sensors 112, audio output device 114, image sensor 116, and a display device 118 may be separate from the computing device 102, and are communicatively coupled to the computing device 102 via a wired or wireless connection.

In operation, the video communication application 132 at a computing device 102 (e.g., computing device 102-1) acquires visual content (e.g., one or more images, video that includes the one or more images as video frames) and an audio signal transmitted from a second computing device 102-2. In particular, the visual content and audio signal may be transmitted from the video communication application 132 at the second computing device 102-2. The computing device 102-1 may display the visual content in a user interface of the video communication application 132, and may further receive user inputs via the user interface and the input device 126. A user may select a location in the visual content (e.g., a location in a frame of the video) via the input device 126, and the visual communication application 132 at computing device 102-1 may receive the user selection.

In response to the user selection, the video communication application 132 at computing device 102-1 may modify the audio signal based on the selected location. In some embodiments, the modifying includes recognizing an entity and/or a type of the entity at the selected location in the visual content (e.g., a person, animal, or object in the frame at the selected location), detecting a sound associated with the entity and/or the entity type included the audio signal, and modifying that sound while maintaining (e.g., not modifying) the other sounds included in the audio signal.

In some embodiments, the modifying includes causing the directionality of the audio sensor 112-2 of the computing device 102-2 to be reoriented. Causing the directionality of the audio sensor 112-2 to be reoriented may include transmitting the selected location in the visual content (e.g., x-y coordinates on a frame of the video) and/or data identifying an entity recognized at the selected location to the video communication application 132 at the second computing device 102-2. The video communication application 132 at the second computing device 102-2 receives the selected location or entity, and determines a corresponding location in the environment 109 of the second computing device 102-2. The video communication application 132 at the second computing device 102-2 may then reorient one or more of the audio sensors 112-2 at the second computing device 102-2 towards the determined location and/or the entity in the environment 109. Additionally or alternatively, the video communication application 132 at the second computing device 102-2 may process the audio signal captured by the audio sensor(s) 112-2 to generate an audio signal that includes a portion (e.g., a "beam" resulting from the beamforming) having a directionality that is oriented towards the determined location and/or the entity in the environment 109. Sound modifications (e.g., amplification or attenuation) may be applied to sounds in the portion having a directionality that is oriented towards the determined location and/or the entity in the environment 109. In some embodiments, causing the directionality to be oriented may further include tracking movement of the selected location or entity within the visual content, where the movement may be caused by movement of the entity and/or the image sensor 116 in the environment 109. Further, in some embodiments, an audio output device 114-1 at computing device 102-1 may output directional audio and/or omnidirectional audio based on the user selection. For example, video communication application 132 may detect (e.g., via image sensor 116-1) user 104 who made the selection among multiple users in proximity of computing device 102-1. Video communication application 132 may output to user 104, via audio output device 114-1, directional audio that includes the modified audio signal, and optionally, omnidirectional audio that includes the unmodified audio signal.

Figure 3A:
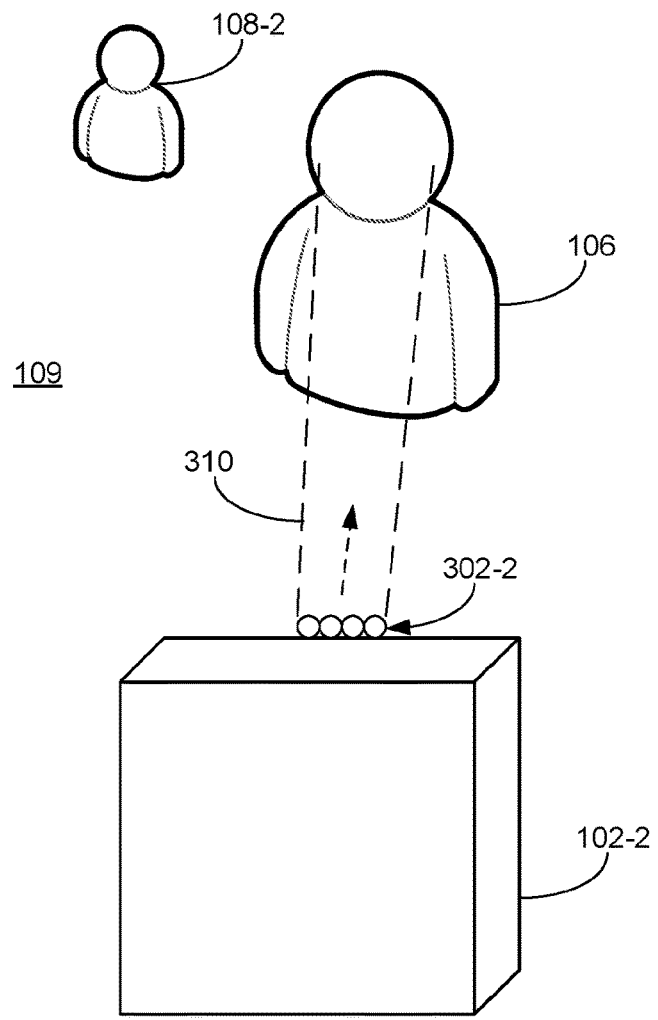
FIGS. 3A-3C illustrate examples of selective modification of audio content in a video communication session, according to one or more aspects of the various embodiments.
Figure 3A:
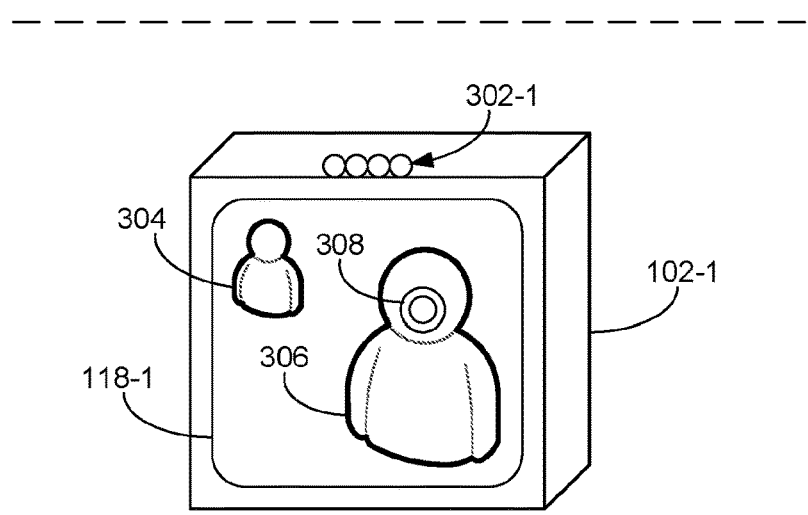
Figure 3B:
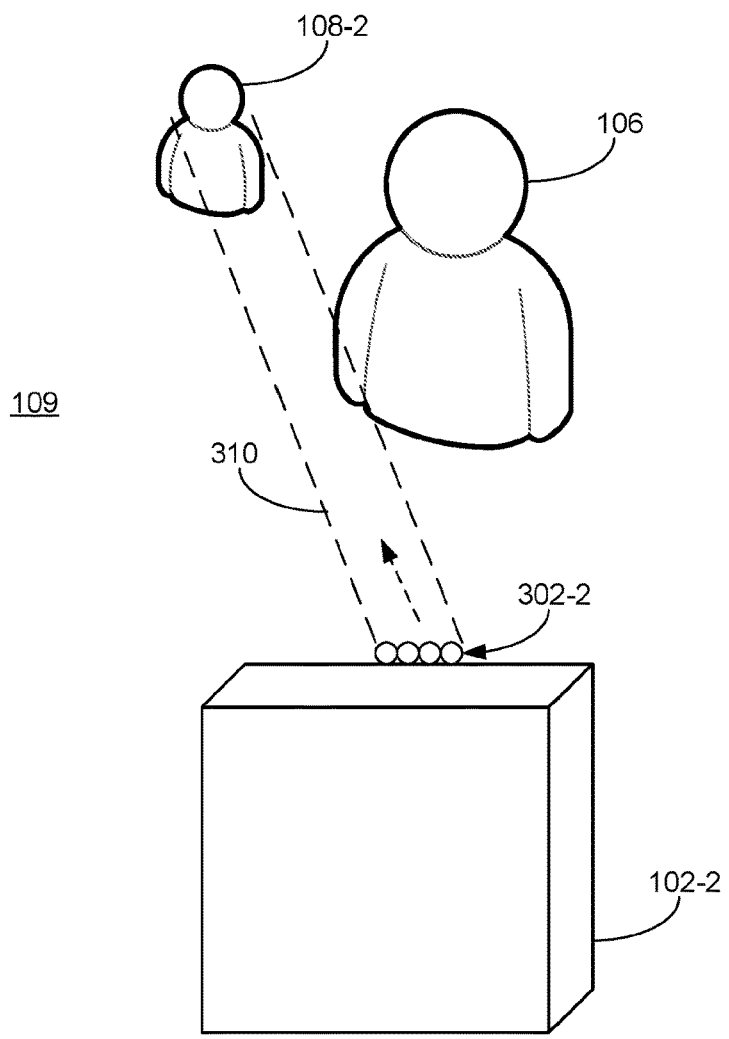
Figure 3B:
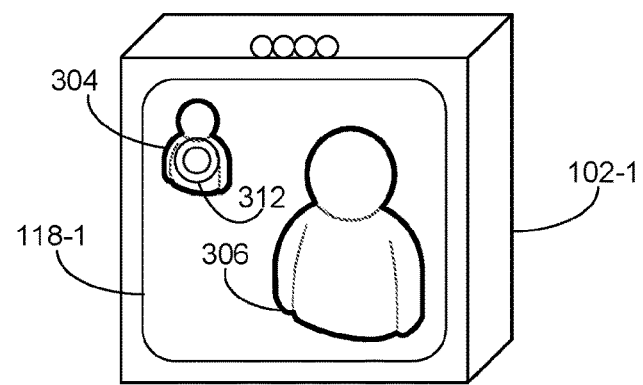
Figure 3C:
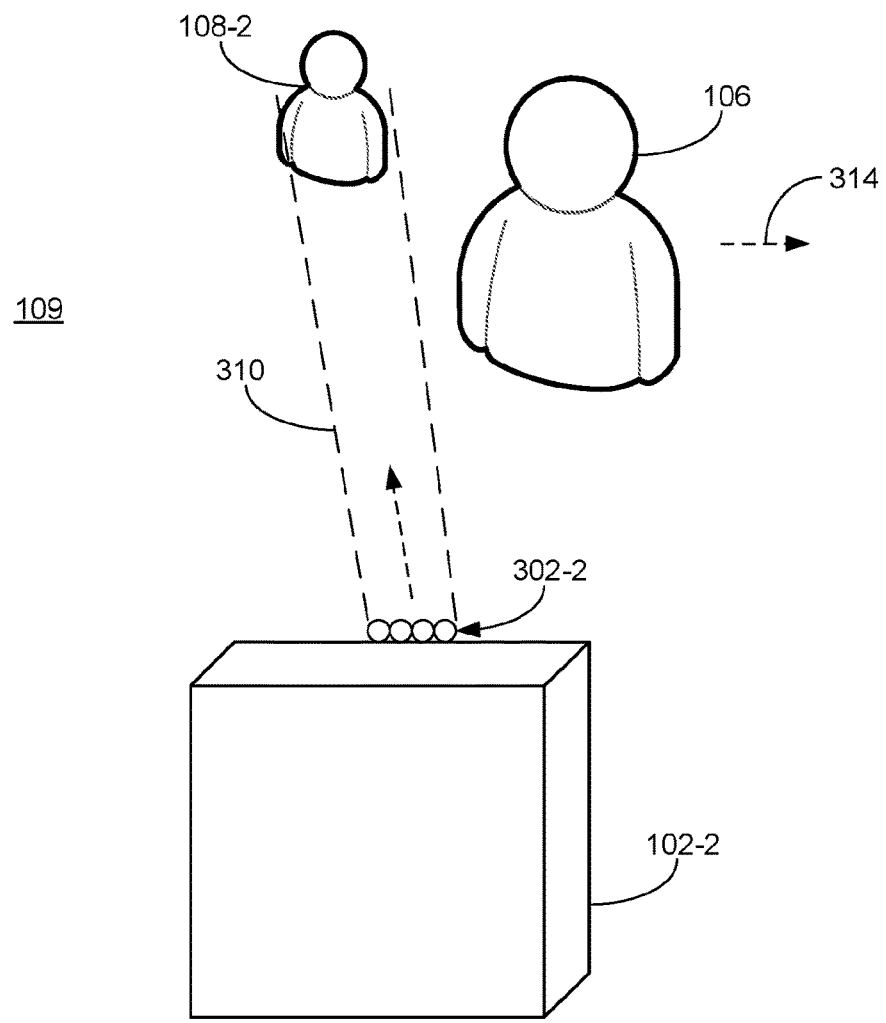
Figure 3C:
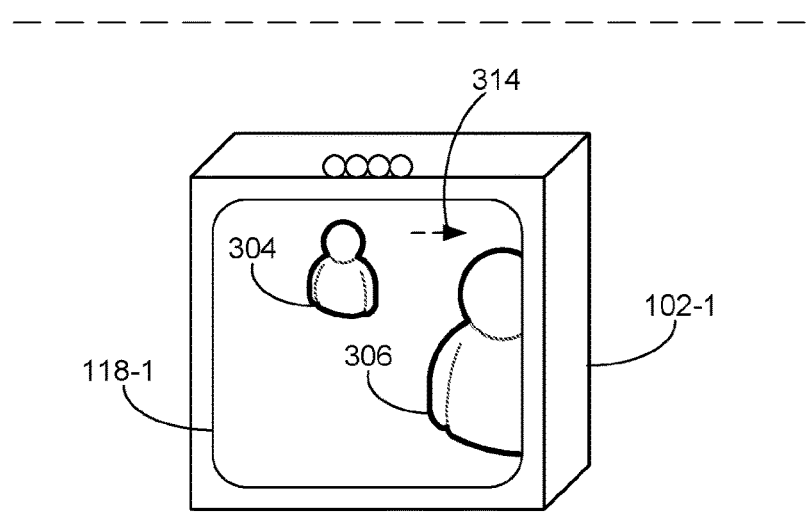

FIGS. 3A-3C illustrate examples of selective modification of audio content in a video communication session, according to one or more aspects of the various embodiments. As shown, FIG. 3A includes computing devices 102-1 and 102-2 in a video communication session. Computing device 102-2 is located in environment 109. User 106 and entity (e.g., a person in the background) 108-2 are also in the environment 109. User 106 is engaging in the video communication session with the user 104 (not shown in FIG. 3A) via the computing devices 102. An image sensor 116-2 (not shown in FIG. 3A) at computing device 102-2 captures a sequence of images of the environment 109, including user 106 and entity 108-2. The computing device 102-2 transmits the sequence of images (e.g., as frames of streaming video) captured via image sensor 116-2 to the computing device 102-1. One or more audio sensors 112-2, which may include one or more microphones 302-2 having a directionality that is orientable, may capture sounds from the environment 109, including sounds from user 106 (e.g., speech by user 106 to user 104) and entity 108-2, and generate an audio signal from the captured sounds. The computing device 102-2 may transmit the audio signal to computing device 102-1.

As noted above, computing device 102-1 may receive an audio signal and video from computing device 102-2. The video may be displayed in a user interface of the video communication application 132 via display device 118-1, and the audio signal may be output via audio output device 114-1 (not shown in FIG. 3A). As shown, user 106 is included in the video as entity 306, and entity 108-2 is included in the video as entity 304. An image sensor 116-1 may capture images of the environment of computing device 102-1, including user 104. One or more audio sensors 112-1, which may include one or more microphones 302-1 having a directionality that is orientable, may capture sounds from the environment of computing device 102-1, including sounds originating from user 104. Computing device 102-1 may transmit the audio signal and video to computing device 102-2, and computing device 102-2 may output the audio signal and video.

In various embodiments, the input devices 126 at computing device 102-1 may include a touch-sensitive display. For example, display device 118-1 may be a touch-sensitive display. User 104 at computing device 102-1 may touch a location on the display area of display device 118-1 to select a location in the video image displayed on display device 118-1. As shown, the user 104 has touched a location on display device 118-1. In response to the selection of the location on display device 118-1, the video communication application 132 at computing device 102-1 determines that that location corresponds to location 308 on the video. The video communication application 132 at computing device 102-1 may transmit the location 308 to the video communication application 132 at computing device 102-2, which determines a location in environment 109 corresponding to the location 308 using any technically feasible technique (e.g., correlating location 308 to two-dimensional or three-dimensional coordinates in environment 109). The video communication application 132 at computing device 102-2 may then orient the directionality 310 of microphone 302-2 toward that location in environment 109. In FIG. 3A, the location 308 includes entity 306 corresponding to user 106, and accordingly the location in environment 109 toward which the directionality 310 is oriented includes user 106. It may be said that the user 104 has selected the entity 306, and by extension user 106, via selection of a location 308 that includes entity 306. By orienting the directionality 310 toward that location and user 106, sounds from that location, including from user 106 may be modified. For example, sounds from user 106 may be amplified, attenuated, muted, or unmuted.

In some embodiments, orienting the directionality 310 includes physically orienting the microphone 302-2. The physical orienting may be performed in any technically feasible manner (e.g., mechanically adjusting the pan and tilt of the microphone 302-2 and/or computing device 102-2). In some other embodiments, orienting the directionality 310 includes applying beamforming, using any technically feasible beamforming technique, on the audio signal captured via audio sensors 112-2, including microphone 302-2, to generate an audio signal that includes a portion having a directionality 310 directed toward the location in environment 109.

Further, in some embodiments, the video communication application 132 at computing device 102-1 may process the video image on which the user selected location 308 to recognize the entity 306. The image processing may be performed using any technically feasible image recognition technique (e.g., object/face/animal/person recognition in images). The image processing may be performed in conjunction with data in stored database 134 (e.g., trained recognition models, profiles for specific individuals that include face and voice recognition data). The video communication application 132 at computing device 102-1 may transmit information indicating the selected location 308 and/or the recognized entity 306 to the video communication application 132 at computing device 102-2. The video communication application 132 at computing device 102-2 may then determine a location in environment 109 corresponding to selected location 308 and/or identify the recognized entity 306 as user 106 (e.g., by matching the recognized entity 306 to user 106 in the video), and orient the directionality 310 of microphone 302-2 toward that location in environment 109 and/or user 106. Additionally or alternatively, the video communication application 132 at computing device 102-1 may process the audio signal received from computing device 102-2 to segment the audio signal into sounds from different entities and/or different types of entities, identify the sound originating from the recognized entity 306 (user 106), and modify that sound originating from user 106 while maintaining the other sounds (e.g., not modifying the other sounds) in the audio signal.

In FIG. 3B, the user 104 (not shown in FIG. 3B) has selected a new location 312 on the video displayed via display device 118-1. The location 312 includes entity 304, which corresponds to entity 108-2. In response to the selection of location 312, the video communication application 132 at computing device 102-1 may transmit the location 312 to computing device 102-2. Additionally or alternatively, the video communication application 132 at computing device 102-1 may process the video image to recognize entity 304. The video communication application 132 at computing device 102-1 may transmit information indicating the selected location 312 and/or the recognized entity 304 to computing device 102-2. In a similar manner as described above, the video communication application 132 at computing device 102-2 may orient the directionality 310 of microphone 302-2 toward entity 108-2 and/or a location in environment 109 that includes entity 108-2. Sounds associated with entity 108-2 and/or that location may be modified.

In some embodiments, movements in the environment 109 relative to image sensor 116-2, including movement of user 106 and entity 108-2 relative to image sensor 116-2, may be tracked. Movement may be tracked by detecting and tracking movement of sets of pixels in the sequence of images captured by computing device 102-2 in any technically feasible manner (e.g., image recognition to detect significant changes in sets of pixels over a period of time). The movement tracking may be performed by computing device 102-1 or computing device 102-2. It should be appreciated that the movement relative to image sensor 116-2 may be caused by the image sensor 116-2 moving (e.g., computing device 102-2 moving and/or panning/tilting) and/or the user 106 and/or entities 108 moving.

As shown in FIG. 3C, both user 106 and entity 108-2 have moved in direction 314 relative to image sensor 116-2. This movement is reflected in entities 304 and 306 moving in direction 314 in the images displayed via computing device 102-1. In response to the user 106 and entity 108 moving, the video communication application 132 at computing device 102-2 may automatically orient the directionality 310 of microphone 302-2 to track the movement. Thus, as shown in FIG. 3C, directionality 310 may continue to be oriented toward entity 108-2 after entity 108-2 has moved in direction 314. As described above, the directionality 310 may be oriented by physically orienting microphone 302-2 to track entity 108-2 and/or by generating an audio signal, via beamforming, that includes a portion that tracks entity 108-2 (e.g., the directionality is oriented toward the entity as the entity moves).

Figure 4A:
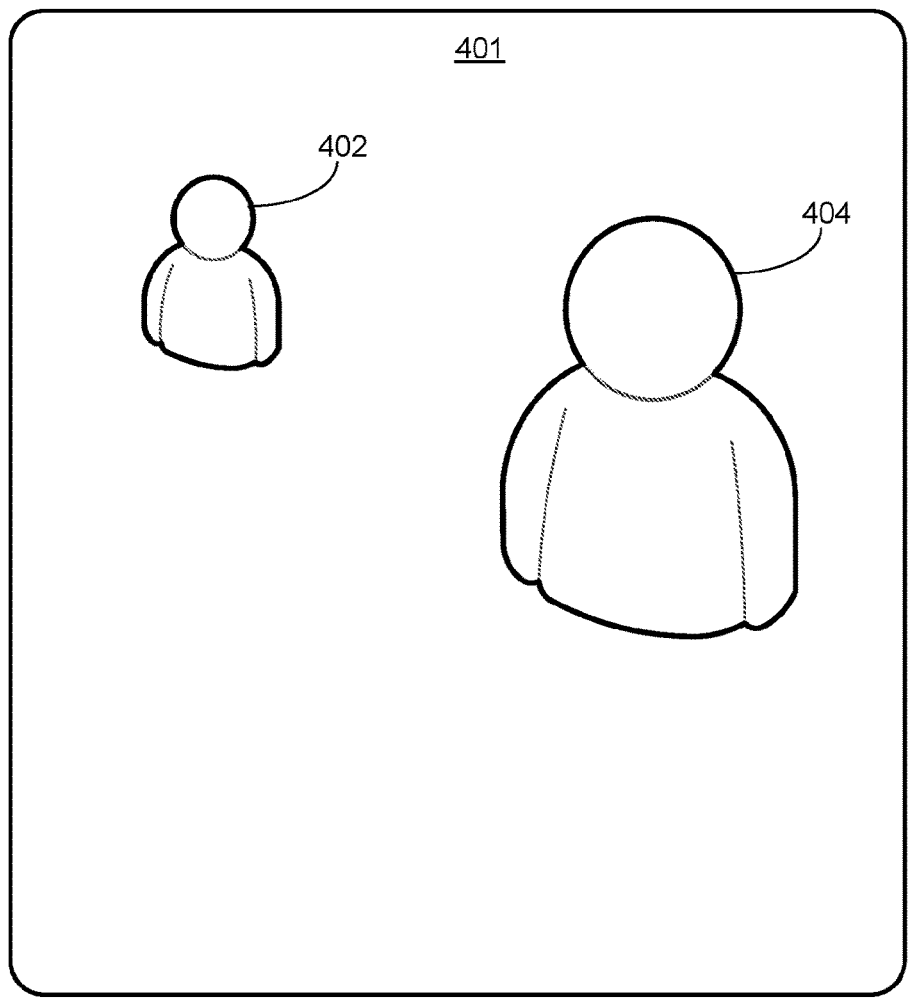
FIGS. 4A-4E illustrate examples of a video communication user interface and interactions with the user interface, according to one or more aspects of the various embodiments.

FIGS. 4A-4E illustrate examples of a video communication user interface 400 and interactions with the user interface 400, according to one or more aspects of the various embodiments. FIG. 4A illustrates video 401 (e.g., video captured via computing device 102-2) of an environment (e.g., environment 109) being displayed in user interface 400 of the video communication application 132 (e.g., the application 132 at computing device 102-1). The user interface 400 may be displayed via a display device 118 (e.g., display device 118-1). As shown, the video 401 includes entities 402 and 404. Each of entities 402 and 404 may correspond to a user or another entity (e.g., entity 402 correspond to entity 108-2, entity 404 corresponds to user 106).

Figure 4B:
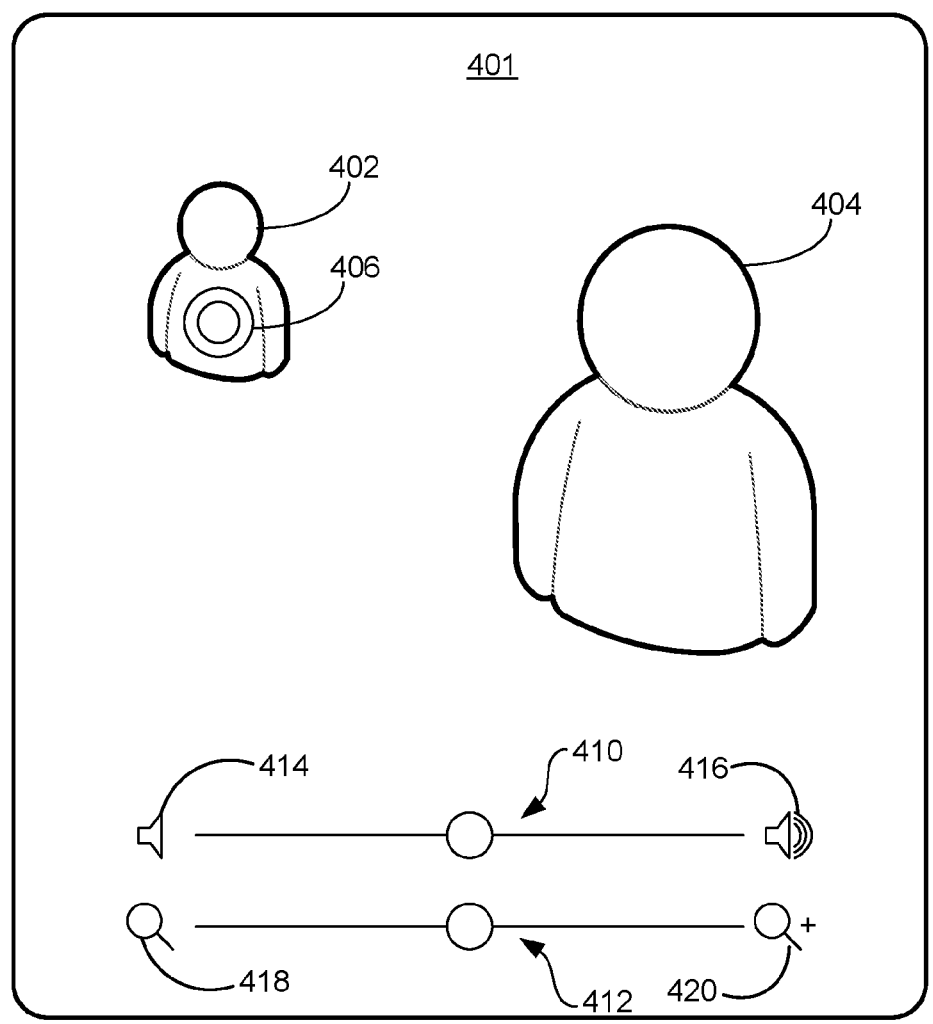
Figure 4C:
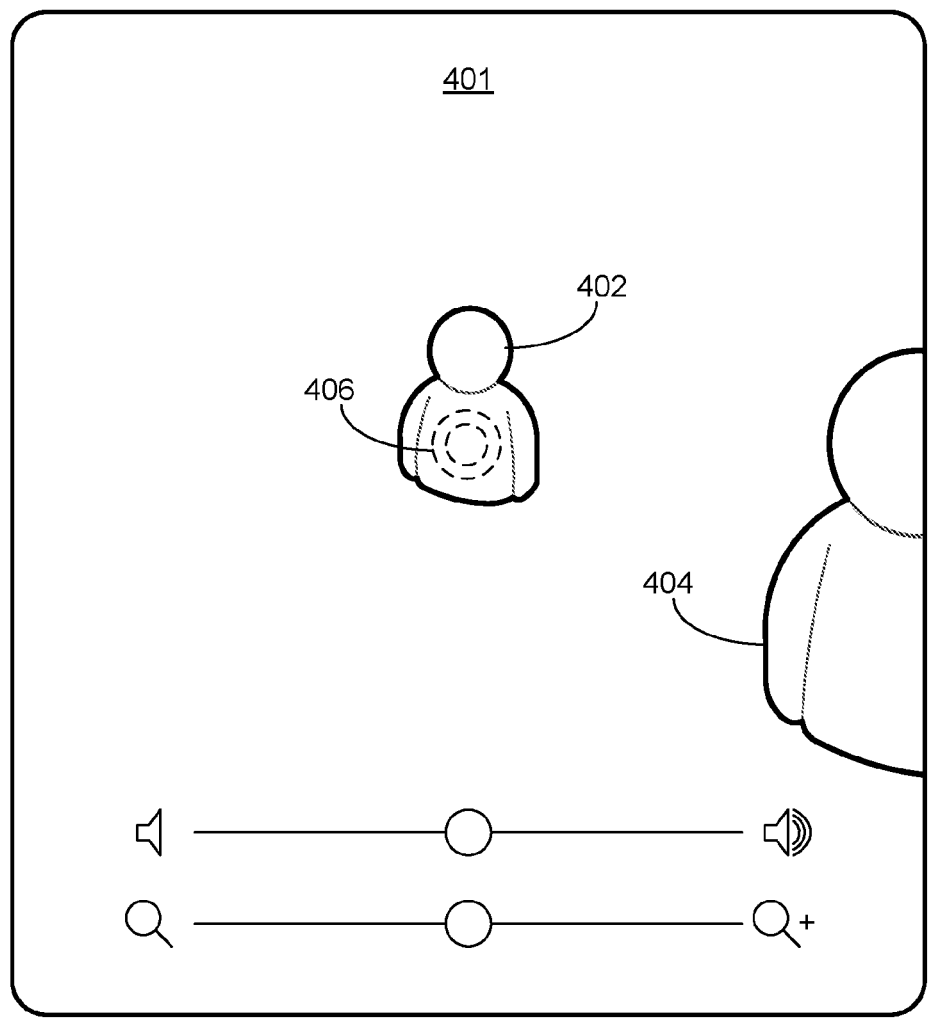

As shown in FIG. 4B, a location 406 on the video 401 may be selected (e.g., by user 104 at computing device 102-1). The location 406 includes entity 402. In some embodiments, the video communication application 132 may automatically center the video 401 within the user interface 400 onto the selected entity 402, in response to the selection of location 406, as shown in FIG. 4C. In some embodiments, in response the selection of entity 402, other entities (e.g., entity 404) in the video 401 may be deemphasized (e.g., by defocusing the frames of the video 401 excluding the selected entity 402).

In some embodiments, a selected entity may be assigned a name and associated data may be saved into database 134 for use in future video communication sessions. For example, the user performs a press-and-hold touch input gesture on location 406. In response to the holding gesture, the video communication application recognizes the entity 402 (e.g., recognizes shape and facial features) and prompts the user to assign a name to the entity 402. The video communication application may store the name and facial features for the entity 402 in a profile for the entity 108-2 corresponding to entity 402 in database 134. In a future video communication session in which the entity 108-2 is included in the video, the user may select the entity 108-2 by referencing the name (e.g., via a voice command or a typed command that includes the name, such as "Mute Andrea!" or "Focus on Andrea!"), and the video communication application may automatically recognize entity 108-2 in response to the command by processing the video images using the stored profile.

Returning to FIG. 4B, in response to the selection, the user interface 400 may display a volume control 410 and a zoom control 412. The volume slider control 410 enables a user to control the volume of the user or entity corresponding to the entity 402 at the selected location 406. The zoom slider control 412 enables a user to control the zooming of the video 401 within user interface 400.

The volume control 410 may include volume down icon 414 and volume up icon 416. These icons 414 and 416 indicate the directions in which the volume slider control 410 may be moved to decrease or increase, respectively, the volume of sounds associated with the selected location 406 and/or entity 402 at the selected location 406. Also, in some embodiments, either or both of the volume down icon 414 and volume up icon 416 may be user-selectable toggles for toggling between muting and unmuting sounds associated with the selected location 406 and/or entity 402 at the selected location 406.

Figure 4D:
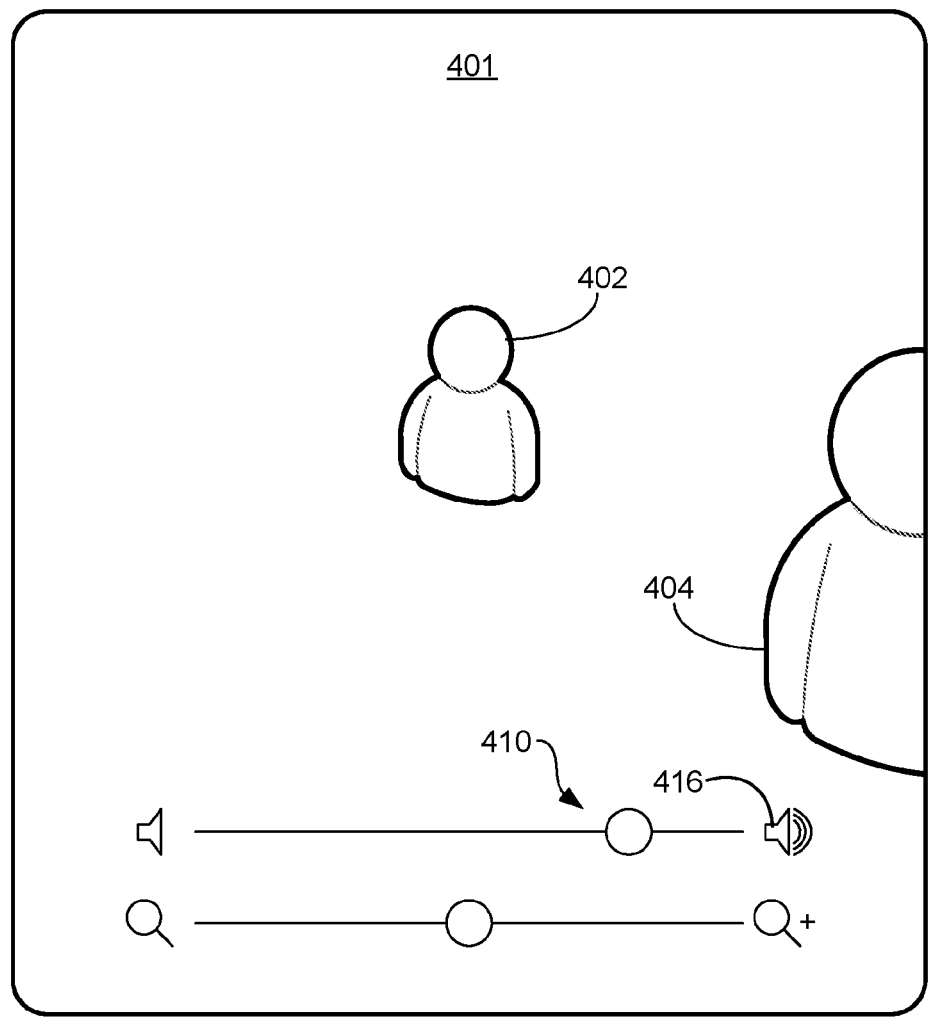

As shown in FIG. 4D, the volume slider control 410 has been moved toward volume up icon 416. In response to the volume slider control 410 being moved toward volume up icon 416, the sound associated with selected location 406 and/or entity 402 (entity 108-2) may be amplified, thereby increasing the volume(s) of those sound(s), while the other sound(s) are maintained at a normal volume or the current volume. The amount of amplification may be based on the position of the volume slider control 410 and/or the amount of movement of the volume slider control 410. Thus, the user interface 400 includes one or more controls and/or options that the user may select and/or manipulate to specify how the sound associated with selected location 406 and/or entity 402 (entity 108-2) is to be modified and/or the amount of modification. Other options for specifying the modification and/or the modification amount may further include, without limitation, attenuation (decreasing volume/amplitude), muting (cancellation), unmuting (ceasing of cancellation), and application of sound effects (e.g., voice alteration, modifying timbre).

Returning to FIG. 4B, the zoom slider control 412 may include zoom out icon 418 and zoom in icon 420. These icons 418 and 420 indicate the directions in which the zoom slider control 412 may be moved to zoom out or zoom in, respectively, the video 401 within the user interface 400. Also, in some embodiments, the zoom out icon 418 may be a user-selectable toggle for toggling between zooming out the video 401 to a minimum zoom level and zooming the video 401 to 100% (e.g., actual size). Similarly, the zoom in icon 420 may be a user-selectable toggle for toggling between zooming in the video 401 to a maximum zoom level and zooming the video 401 to 100%.

Figure 4E:
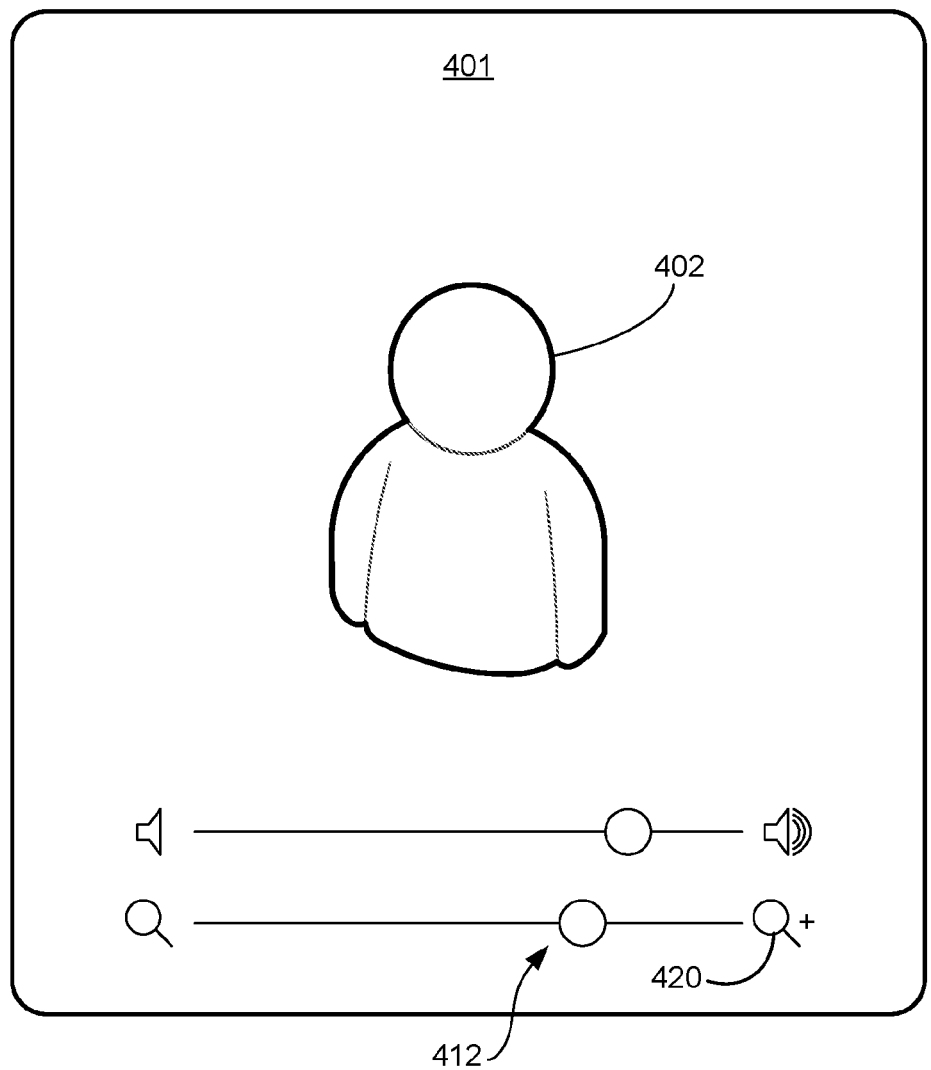

As shown in FIG. 4E, the zoom slider control 412 has been moved toward zoom in icon 420. In response to the zoom slider control 412 being moved toward zoom in icon 420, the video 401 has been zoomed in. Consequently, entity 402 occupies a larger portion of the user interface 400 than as shown in FIG. 4B. The amount of zooming may be based on the position of the zoom slider control 412.

While the above examples describe modifying sounds associated with a person and/or orienting the directionality of an audio sensor toward a person, it should be appreciated that the above examples are also applicable when the entity is an animal or an object. For example, the user may select a location in the video that includes a loud object the user wishes to mute (e.g., a dishwasher operating in the background). In response to the user selecting the dishwasher, the sound associated with the dishwasher may be modified (e.g., attenuating, cancelling). Further, in some embodiments, entities whose sounds have been modified may be selectively blurred within the user interface 400. For example, an entity whose sound has been muted may be blurred in the video 401.

Further, it should be appreciated that multiple entities may be selected individually or collectively, and sounds associated with the entities individually or collectively may be modified. For example, a first entity may be selected to mute that first entity's sound, and a second entity may be selected to amplify that second entity's sound. As another example, multiple entities may be selected as a group, and the sounds associated with entities in the group may be muted or amplified.

Figure 5:
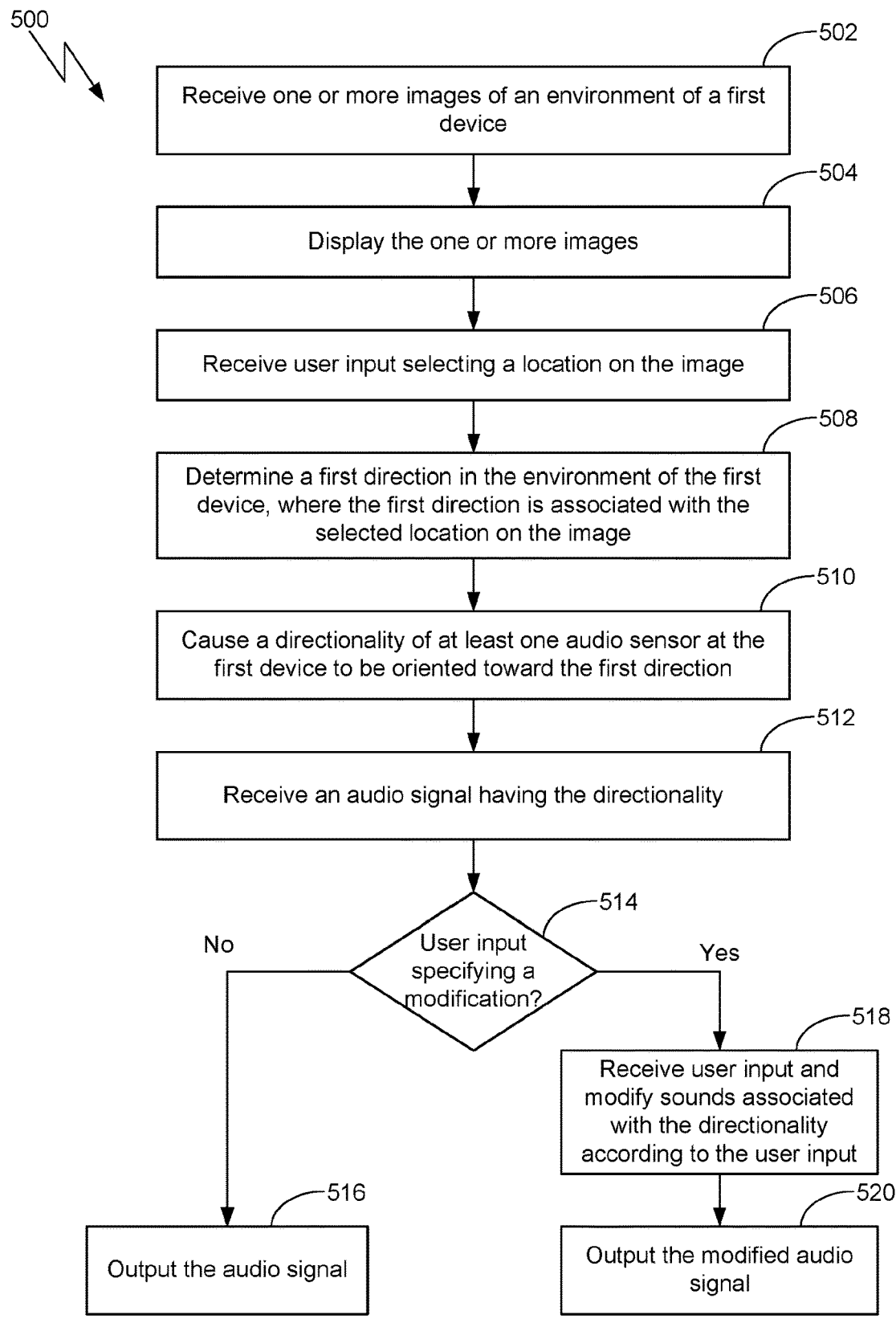
FIG. 5 illustrates a flowchart of method steps for orienting the directionality of an audio sensor in a video communication session, according to one or more aspects of the various embodiments.

FIG. 5 illustrates a flowchart of method steps for orienting the directionality of an audio sensor in a video communication session, according to one or more aspects of the various embodiments. Although the method steps are described in conjunction with the systems of FIGS. 1-4E, persons skilled in the art will understand that any system configured to perform the methods, in any order, falls within the scope of the various embodiments.

As shown in FIG. 5, a method 500 begins at step 502, where a video communication application may receive one or more images of an environment of the first device. For example, a video communication application 132 at computing device 102-1 may receive a sequence of images (e.g., frames in streaming video) from computing device 102-2. The sequence of images may be captured via image sensor 116-2 at computing device 102-2 and transmitted to computing device 102-1 via the video communication application 132 at computing device 102-2.

At step 504, the video communication application may display one or more images. For example, the video communication application 132 at computing device 102-1 may display the sequence of images as video 401 in a user interface 400. At step 506, the video communication application then receives user input selecting a location in the image. For example, the video communication application 132 at computing device 102-1 may receive user input (e.g., touch input on a touch-sensitive display device 118-1) selecting a location 406 in the video 401. In some embodiments, the video communication application 132 at computing device 102-2 may display the images captured via image sensor 116-2 as well (e.g., in an inset area in user interface 400, as in a picture-in-picture functionality).

At step 508, the video communication application may determine a first direction in the environment of the first device, where the first direction is associated with the selected location in the image. For example, in some embodiments, the video communication application 132 at computing device 102-1 may recognize an entity 402 at the selected location 406. The video communication application 132 at computing device 102-1 may transmit information indicating the selected location 406 in the image and/or the recognized entity 402 to the computing device 102-2. The entity 402, which corresponds to an entity 108-2 in the environment 109, may be associated with a location, and thus a direction, in the environment 109 relative to computing device 102-2. In some other embodiments, the video communication application 132 at computing device 102-1 transmits the selected location 406 to the computing device 102-2. The selected location 406 may correspond to a location in environment 109. Accordingly, the selected location 406 is associated with a direction in the environment 109 relative to the computing device 102-2.

At step 510, the video communication application causes a directionality of at least one audio sensor at the first device to be oriented toward the first direction. For example, the video communication application 132 at computing device 102-1 could cause computing device 102-2 to orient the directionality of microphone 302-2 toward the direction associated with the selected location 406 and/or the recognized entity 402 by transmitting the selected location 406 and/or the recognized entity 402 to computing device 102-2. The transmission to computing device 102-2 may include a request to orient the directionality of the microphone toward the direction associated with the selected location 406 and/or the recognized entity 402.

The computing device 102-2 may orient the directionality of at least one audio sensor 112-2 toward the direction associated with the selected location 406 and/or the recognized entity 402. For example, the video communication application 132 at computing device 102-2 may mechanically or physically adjust the orientation of an audio sensor 112-2 (e.g., microphone 302-2). The mechanical or physical adjustment may include mechanically or physically orienting the audio sensor and/or the computing device 102-2. As another example, the video communication application 132 at computing device 102-2 may process an audio signal captured by the at least one audio sensor 112-2 by applying a beamforming technique to the audio signal to generate an audio signal that includes a portion having a directionality that is oriented toward the direction associated with the selected location 406 and/or the recognized entity 402.

At step 512, the video communication application receives or otherwise acquires an audio signal having the directionality of step 510. The computing device 102-1 receives an audio signal captured via audio sensors 112-2 of computing device 102-2. The audio signal may include a portion having a directionality that is oriented toward the first direction. In various embodiments, the audio signal includes one or more sounds associated with the first direction (e.g., sounds originating from the first direction) and one or more other sounds (e.g., sounds originating from other directions in environment 109). In some embodiments, the audio signal is a mix of an omnidirectional audio signal (e.g., an audio signal captured via an omnidirectional audio sensor 112) and a directional audio signal (e.g., an audio signal captured via a directional audio sensor array 112 having a directionality oriented in the first direction). In some other embodiments, the audio signal may be an audio signal that has been generated via application of a beamforming technique on the audio signal captured by the audio sensor 112.

At step 514, a user input specifying a sound modification may be detected. At computing device 102-1, the user 104 may make an input via input device 116-1 and the video communication application 132, specifying a modification to be made to one or more sounds associated with the directionality of the at least one audio sensor. For example, the user 104 may manipulate a volume slider 410 in user interface 400 of the video communication application 132 to specify that those sounds should increase or decrease in volume. If no such user input is detected, the method proceeds to step 516. If such a user input is detected, the method proceeds to step 518.

At step 516, the video communication application outputs the audio signal. The video communication application 132 at computing device 102-1 may output the audio signal received in step 512 via audio output device 114-1.

At step 518, the video communication application receives a second user input specifying a sound modification and modifies, according to the second user input, one or more sounds, included in the audio signal received in step 512, that are associated with the directionality. For example, the video communication application 132 at computing device 102-1 could receive user input specifying a sound modification (e.g., an increase in volume). The video communication application 132 would then modify one or more sounds, included in the audio signal, that were received from the first direction (e.g., from an entity in the first direction) based on a modification specified in the second user input. For example, if the second user input specifies a volume increase, then the volume of sounds received from the first direction may be increased. If the audio signal is an audio signal generated from beamforming, then the modification may be applied to one or more sounds included in the portion of the audio signal having a directionality that is oriented toward the first direction. Additionally, other sounds in the audio signal that were not received from the first direction may be maintained (e.g., by making no changes to the volume or amplitude of those other sounds).

At step 520, the video communication application outputs the modified audio signal. The video communication application 132 at computing device 102-1 may output the modified audio signal received in step 512 via audio output device 114-1. The modified audio signal includes the sounds, associated with the first direction, that were modified in step 518. The modified audio may signal further include other sounds, not associated with the first direction, that were not modified in step 518 (e.g., sound that were maintained at the same volume). In some embodiments, the output may include a combination of the modified audio signal with an omnidirectional audio signal. In particular, the modified audio signal, which includes the sounds modified in step 518 above, may be combined with the omnidirectional audio signal to generate a combined audio signal that is omnidirectional and includes the sound modifications. For example, if the user 104 had specified, in step 514, a volume decrease for sounds associated with the directionality, then an omnidirectional audio signal may be combined with an inverted version of the audio signal received in step 512, as adjusted to achieve the specified amount of volume decrease, to generate a combined audio signal in which the sounds associated with the directionality are attenuated (e.g., decreased in volume) or even cancelled. This modification via combining audio signals may be performed gradually (e.g., the audio signal received in step 512 is modified incrementally and combined with the omnidirectional audio signal at each increment).

Figure 6:
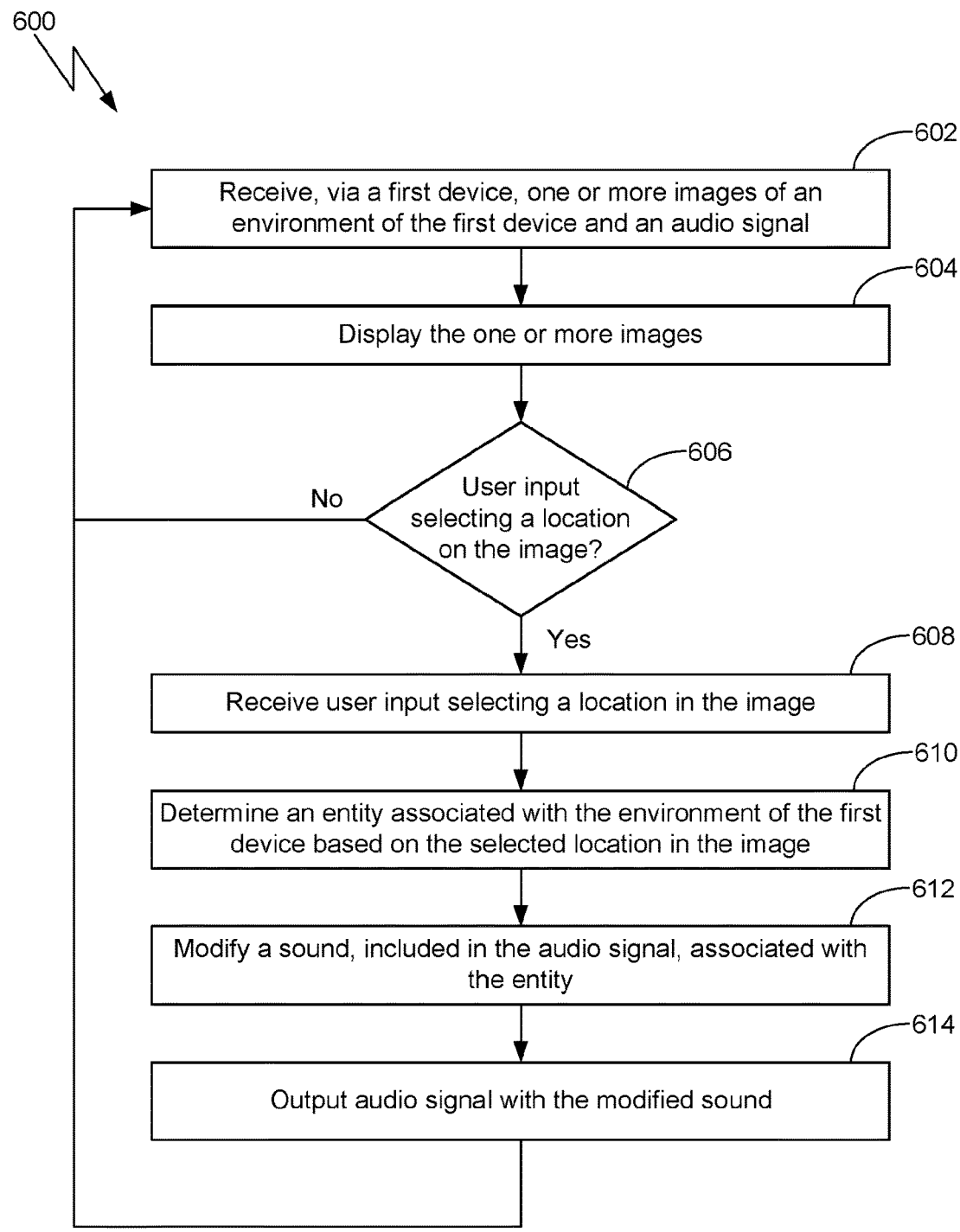
FIG. 6 illustrates a flowchart of method steps for selectively modifying a sound associated with an entity in a video communication session, according to one or more aspects of the various embodiments.

FIG. 6 illustrates a flowchart of method steps for selectively modifying a sound associated with an entity in a video communication session, according to one or more aspects of the various embodiments. Although the method steps are described in conjunction with the systems of FIGS. 1-4E, persons skilled in the art will understand that any system configured to perform the methods, in any order, falls within the scope of the various embodiments.

As shown in FIG. 6, a method 600 begins at step 602, where a video communication application may receive, via a first device, one or more images of an environment of the first device and an audio signal. For example, a video communication application 132 at computing device 102-1 may receive a sequence of images (e.g., frames in streaming video) from computing device 102-2. The sequence of images may be captured via image sensor 116-2 at computing device 102-2. The video communication application 132 at computing device 102-1 may further receive an audio signal from the computing device 102-2. The audio signal may be captured by audio sensors 112-2 at the computing device 102-2.

At step 604, the video communication application may display one or more images. For example, the video communication application 132 at computing device 102-1 may display the sequence of images as video 401 in a user interface 400. Further, video communication application may output the audio signal received at step 602 (e.g., via audio output device 114-1 at computing device 102-1).

At step 606, a user input selecting a location in the image may be detected. At computing device 102-1, the user 104 may make an input via input device 116-1 and the video communication application 132, selecting a location in the video 401. For example, the user 104 may tap on a location 406 in the video 410. If no such user input is detected, the method proceeds to step 602, where the video communication application may continue to receive one or more images and the audio signal. If such user input is detected, the method proceeds to step 608.

At step 608, the video communication application may receive the user input selecting a location in the image. For example, the video communication application 132 at computing device 102-1 may receive user input (e.g., touch input on a touch-sensitive display device 118-1) selecting a location 406 in the video 401.

At step 610, the video communication application may determine an entity associated with the environment of the first device based on the selected location in the image. For example, in some embodiments, the video communication application 132 at computing device 102-1 may recognize an entity 402 at the selected location 406. The video communication application 132 may process the one or more images to recognize a type of the entity 402 (e.g., recognize that the entity 402 corresponds to a person, an object, or an animal; recognize that the entity 402 corresponds to a specific type of person, object, or animal) and/or recognize a specific entity (e.g., recognize entity 402 as user entity 108-2) in environment 109.

At step 612, the video communication application modifies a sound, included in the audio signal, associated with the entity. For example, the video communication application 132 at computing device 102-1 processes the audio signal to segment the audio signal into sounds by type and/or specific entity. The processing to segment the audio signal may be performed using any technically feasible technique (e.g., sound object detection, sound segmentation, digital signal processing, machine learning algorithms, etc.) The video communication application 132 at computing device 102-1 may then modify the sound associated with the entity and/or a type of the entity included in the audio signal, while maintaining at least a portion of the audio signal (e.g., a sound associated with a second entity and/or a type thereof) as unmodified. In various embodiments, the video communication application may further receive a user input specifying a modification to the sound after receiving the user input selecting location 406 in step 608, and proceeds to modify the sound according to the specified modification. For example, similar to the user input described above in conjunction with steps 514 and 518 of FIG. 5, the user 104 may make an input specifying the sound modification to be made. In response to that user input, the video communication application modifies the sound according to the specified modification. In some embodiments, if no user input specifying a modification is received, then the sound may be modified according to a default modification (e.g., a mute/unmute toggle).

At step 614, the video communication application outputs the audio signal with the modified sound. The video communication application 132 at computing device 102-1 may output the audio signal via audio output device 114-1, where the audio signal output includes sound associated with the entity, as modified in step 612. After step 614, the method may return to step 602, where the video communication application may continue to receive one or more images and the audio signal. However, the output audio signal may continue to include the modified sound. Further, the user may select a different location in the images at step 606, and a different sound may be modified based on the new selected location.

In some embodiments, the computing device 102 may include one or more elements that indicate an entity that has been selected for sound modification. For example, the computing device 102-2 may include mechanically actuatable (e.g., pan and/or tilt) structures that resemble eyes and/or ears, which may be oriented toward a direction and/or entity that has been selected at the computing device 102-1.

Accordingly, the user 106 at the computing device 102-2 may be made aware of who or what the user 104 at computing device 102-1 has selected for sound modification. Alternatively, visual elements (e.g., animated ears) that indicate an entity that has been selected for sound modification may be included in the user interface 400.

In some embodiments, the computing device 102 may determine the audio characteristics of the environment 109. For example, the computing device 102-2 may determine an audio impulse response of the environment 109 and share information indicating that audio impulse response of the environment 109 with the computing device 102-1. The audio signal captured by computing device 102-2 may be processed and/or a sound included in the audio signal may be modified based at least on the audio impulse response of the environment 109.

In some embodiments, the video communication application 132 may be configured to apply a default sound modification. In such embodiments, the default modification may be applied once the user selects an entity, if the user does not explicitly specify a modification. For example, the default modification may be a muting toggle. Thus, whenever the user selects an entity for sound modification, the sound associated with the entity is muted (e.g., cancelled) or unmuted unless the user specifies a different modification.

As noted above, the sound modification may include modification of a sound associated with an entity and/or the type of the entity. In some embodiments, the database 134 may include audio profiles of types of sounds. An audio profile may include information identifying significant frequency sub-bands for a type of sound. The video communication application may modify the sound associated with an entity and/or the type of the entity based on a corresponding audio profile, thereby modifying specific frequency sub-bands of the sound. Further details regarding modifying certain frequency sub-bands of a sound are disclosed in PCT Application No. PCT/M2019/054648, titled "Sound Modification Based on Frequency Composition," filed Jun. 5, 2019, which is hereby incorporated by reference herein in its entirety.

In some embodiments, the recognition of an entity may further include recognition of an emotional state of an entity based on the image processing. For example, the image processing may further include recognition of facial features for emotional state detection. Based on the emotional state detection, sounds associated with the entity may be automatically modified (e.g., sounds from an angry person may be attenuated or altered).

In sum, a video communication system selectively modifies audio content in a video communication session. At a first device, a video communication application displays one or more images (e.g., video) captured by a second device. A user of the first device may interact with the images to select a location in the images. The video communication application at the first device then selectively modifies audio content received from the second device based on the selected location in the images. The selective modification may include recognizing a location in an environment of the second device and/or an entity positioned at the location in the environment selected by the user, and then modifying sounds associated with that location and/or entity.

At least one advantage and technological improvement of the disclosed techniques is that the audio content of a video communication session may be selectively modified. Accordingly, undesirable sounds in a video communication session may be reduced or eliminated and/or desirable sounds in the session may be amplified, thereby enhancing the effectiveness and enjoyment of the video communication experience. Another advantage and technological improvement is that an efficient interface for selective modification of audio content of a video communication session is provided, thereby further enhancing the enjoyment of the video communication experience.

1. In some embodiments, a computer-implemented method comprises receiving, via a first device, an image of an environment of the first device and an audio signal associated with the environment; receiving first user input selecting a location in the image; and modifying a first sound included in the audio signal based on the selected location in the image, wherein at least a portion of the audio signal is unmodified.

2. The method of clause 1, wherein modifying the first sound comprises causing a directionality of at least one audio sensor at the first device to be oriented toward a first location in the environment based on the selected location in the image, wherein the first sound is associated with the first location.

3. The method of clauses 1 or 2, wherein causing the directionality of the at least one audio sensor at the first device to be oriented toward the first location comprises causing a beamforming technique to be applied to the audio signal to generate a second audio signal comprising a portion associated with the first location.

4. The method of any of clauses 1-3, further comprising detecting movement of the selected location in the image; causing the directionality of the at least one audio sensor at the first device to be oriented toward a second location in the environment based on the movement of the selected location in the image; and modifying the first sound in accordance with the directionality toward the second location, wherein the first sound is associated with the second location.

5. The method of any of clauses 1-4, further comprising recognizing a first entity associated with the selected location in the image, wherein the first sound is associated with the first entity.

6. The method of any of clauses 1-5, further comprising detecting movement of the first entity; and in response to detecting the movement, modifying the first sound based on the movement of the first entity.

7. The method of any of clauses 1-6, further comprising receiving second user input specifying a sound modification, and wherein modifying the first sound comprises modifying the first sound in accordance with the sound modification.

8. The method of any of clauses 1-7, wherein the sound modification comprises at least one of amplifying, attenuating, cancelling, muting, un-muting, adjusting timbre, adjusting tone, adjusting pitch, and replacing the first sound with a second sound.

9. The method of any of clauses 1-8, further comprising receiving second user input selecting a second location in the image; and modifying a second sound included in the audio signal based on the selected second location in the image.

10. The method of any of clauses 1-9, wherein a first type of sound modification applied to the second sound is different than a second type of sound modification applied to the first sound.

11. In some embodiments, one or more non-transitory computer readable storage media store instructions, that, when executed by at least one processor, cause the at least one processor to perform the steps of receiving, via a first device, an image of an environment of the first device and an audio signal; receiving first user input selecting a location in the image; and modifying a first sound included in the audio signal based on the selected location in the image, wherein at least a portion of the audio signal is unmodified.

12. The one or more computer readable storage media of clause 11, wherein modifying the first sound comprises causing a directionality of at least one audio sensor at the first device to be oriented toward a first location in the environment based on the selected location in the image, wherein the first sound is associated with the first location.

13. The one or more computer readable storage media of clauses 11 or 12, further comprising recognizing a first entity associated with the selected location in the image, wherein the first sound is associated with the first entity.

14. The one or more computer readable storage media of any of clauses 11-13, further comprising detecting movement of the first entity; and in response to detecting the movement, modifying the first sound based on the movement of the first entity.

15. The one or more computer readable storage media of any of clauses 11-14, wherein recognizing the first entity comprises recognizing a type of the first entity, and modifying the first sound comprises modifying the first sound in accordance with the type of the first entity.

16. In some embodiments, a system comprises memory; and at least one processor coupled to the memory and configured to acquire an image of an environment of a first device; receive information associated with a location in the image selected via user input; and based on the information, cause a directionality of at least one audio sensor at the first device to be oriented toward a first location in the environment that corresponds to the location in the image.

17. The system of clause 16, wherein the at least one processor is configured to cause the directionality of the at least one audio sensor at the first device to be oriented toward the first location in the environment by causing a mechanical orientation of the at least one audio sensor to be adjusted.

18. The system of clauses 16 or 17, wherein the at least one processor is configured to cause the directionality of the at least one audio sensor at the first device to be oriented toward the first location in the environment by causing a beamforming technique to be applied to an audio signal associated with the at least one audio sensor to generate a second audio signal comprising a portion associated with the first location.

19. The system of any of clauses 16-18, wherein the at least one processor is further configured to recognize a first entity at the first location in the environment based on the location in the image selected via the user input.

20. The system of any of clauses 16-19, wherein the at least one processor is further configured to modify a sound associated with the first entity.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
receiving, by a second device from a first device, an image of an environment of the first device and an audio signal associated with the environment;
displaying, by the second device, the image of the environment;
receiving, by the second device, first user input selecting a location in the image; and
modifying, by the second device, a first sound included in the audio signal corresponding to the selected location in the image, wherein a second sound included in the audio signal not corresponding to the selected location in the image is unmodified.

2. The method of claim 1, wherein modifying the first sound comprises causing a directionality of at least one audio sensor at the first device to be oriented toward a first location in the environment based on the selected location in the image, wherein the first sound is associated with the first location.

3. The method of claim 2, wherein causing the directionality of the at least one audio sensor at the first device to be oriented toward the first location comprises causing a beamforming technique to be applied to the audio signal to generate a second audio signal comprising a portion associated with the first location.

4. The method of claim 2, further comprising:
detecting movement of the selected location in the image;
causing the directionality of the at least one audio sensor at the first device to be oriented toward a second location in the environment based on the movement of the selected location in the image; and
modifying the first sound in accordance with the directionality toward the second location, wherein the first sound is associated with the second location.

5. The method of claim 1, further comprising recognizing a first entity associated with the selected location in the image, wherein the first sound is associated with the first entity.

6. The method of claim 5, further comprising:
detecting movement of the first entity; and
in response to detecting the movement, modifying the first sound based on the movement of the first entity.

7. The method of claim 1, further comprising receiving second user input specifying a sound modification, and wherein modifying the first sound comprises modifying the first sound in accordance with the sound modification.

8. The method of claim 7, wherein the sound modification comprises at least one of amplifying, attenuating, cancelling, muting, un-muting, adjusting timbre, adjusting tone, adjusting pitch, and replacing the first sound with a second sound.

9. The method of claim 1, further comprising:
receiving second user input selecting a second location in the image; and
modifying a second sound included in the audio signal based on the selected second location in the image.

10. The method of claim 9, wherein a first type of sound modification applied to the second sound is different than a second type of sound modification applied to the first sound.

11. One or more non-transitory computer readable storage media storing instructions, that, when executed by at least one processor, cause the at least one processor of a second device to perform the steps of:
receiving, from a first device different from the second device, an image of an environment of the first device and an audio signal associated with the environment;
displaying the image of the environment;
receiving first user input selecting a location in the image; and
modifying a first sound included in the audio signal corresponding to the selected location in the image, wherein a second sound included in the audio signal not corresponding to the selected location in the image is unmodified.

12. The one or more computer readable storage media of claim 11, wherein modifying the first sound comprises causing a directionality of at least one audio sensor at the first device to be oriented toward a first location in the environment based on the selected location in the image, wherein the first sound is associated with the first location.

13. The one or more computer readable storage media of claim 11, further comprising recognizing a first entity associated with the selected location in the image, wherein the first sound is associated with the first entity.

14. The one or more computer readable storage media of claim 13, further comprising:
detecting movement of the first entity; and
in response to detecting the movement, modifying the first sound based on the movement of the first entity.

15. The one or more computer readable storage media of claim 13, wherein recognizing the first entity comprises recognizing a type of the first entity, and modifying the first sound comprises modifying the first sound in accordance with the type of the first entity.

16. A first device comprising:
memory; and
at least one processor coupled to the memory and configured to:
acquire, from a second device different from the first device, an image of an environment of the second device;
display the image of the environment;
receive information associated with a location in the image selected via user input;
based on the information, cause a directionality of at least one audio sensor at the first device to be oriented toward a first location in the environment that corresponds to the location in the image; and
modify a first sound included in an audio signal corresponding to the location in the image, wherein a second sound included in the audio signal not corresponding to the selected location in the image is unmodified.

17. The first device of claim 16, wherein the at least one processor is configured to cause the directionality of the at least one audio sensor at the first device to be oriented toward the first location in the environment by causing a mechanical orientation of the at least one audio sensor to be adjusted.

18. The first device of claim 16, wherein the at least one processor is configured to cause the directionality of the at least one audio sensor at the first device to be oriented toward the first location in the environment by causing a beamforming technique to be applied to an audio signal associated with the at least one audio sensor to generate a second audio signal comprising a portion associated with the first location.

19. The first device of claim 16, wherein the at least one processor is further configured to recognize a first entity at the first location in the environment based on the location in the image selected via the user input.

20. The first device of claim 19, wherein the at least one processor is further configured to modify a sound associated with the first entity.

* * * * *